Figure 1:
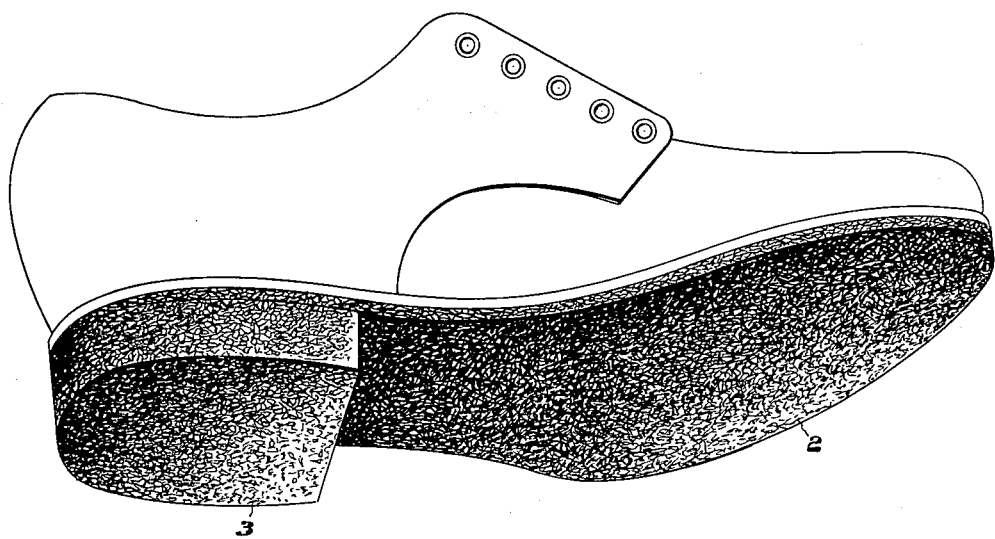

July 29, 1941.   E. W. DUNBAR   2,250,987

SHOE SOLE, HEEL, AND THE LIKE

Filed Dec. 18, 1939

INVENTOR
Ernest W. Dunbar,
BY
ATTORNEY

Patented July 29, 1941

2,250,987

UNITED STATES PATENT OFFICE 2,250,987

SHOE SOLE, HEEL, AND THE LIKE

Ernest W. Dunbar, Hudson, Mass., assignor to Cambridge Rubber Co., Cambridge, Mass., a corporation of Massachusetts Application December 18, 1939, Serial No. 309,758

10 Claims. (Cl. 260—742)

It has been proposed heretofore to incorporate cork in some finely divided form, as, for example, the so-called "ground," "shredded," or "granular" cork, in those rubber compositions from which various tread elements of shoes, such as outsoles, heels, mid-soles, and similar articles are made. The cork particles are intended to perform three valuable functions:

First: To reduce the slipperiness of the rubber tread surface when wet;

Second: To minimize the excessive weight of a rubber outsole or heel, and to produce an article comparable in weight to a corresponding article made of leather; and Third: To improve the heat insulating properties of these articles.

A serious objection to these products as heretofore made has been that the cork particles are not securely anchored in the rubber composition. They appear to be held in place chiefly by being mechanically interlocked in the rubber. In any event, they soon become loosened, when once exposed on a wearing surface, and fall out. Other objections to these compositions are the facts that they are brittle, do not resist abrasion well, and exhibit an abnormal action during vulcanization.

To overcome the foregoing difficulties in a thoroughly practical manner, constitutes the chief object of the present invention.

According to prior processes of manufacturing products of the character above described, the cork in a dry and granular condition has been introduced into a batch of rubber compound during the mixing or milling operation. From this point on, the process has been typical of those customarily followed in making rubber soles and heels.

I have found that the union of the cork particles to the rubber can be improved immensely by the pre-treatment of this material with rubber latex before the cork is mixed with the other constituents of the final composition. A typical process consists in mixing dry granulated cork with a suitable proportion of latex, the mixing operation being performed in a mixing kettle, or in any other convenient apparatus. The latex may be either vulcanized or unvulcanized. Artificially produced dispersions of rubber have been made which are alleged to have practically the same properties as latex, either vulcanized or unvulcanized, including the small and definite particle size and the same qualities of rubber. Any of these which are really the equivalent of vulcanized or unvulcanized latex may be used in place of them, and the term "latex" will be hereinafter used, where the context permits, to include all of these materials, although it will be understood that the selection of one or the other will naturally depend upon the nature of the article being produced and practical conditions in the process of manufacture. Similarly, the rubber residue left in and adhering to the cork particles after the dispersing medium has been evaporated will be referred to as "latex rubber."

After the mixing operation has been completed, the material is dried either by vacuum, air drying, or in any other convenient manner, in order to drive off the water constituent of the latex.

By starting with the cork initially in a dry condition and mixing the latex thoroughly with it, I find that, after the material has dried, in addition to coating the cork particles with latex rubber, a definite penetration of the rubber into the pores and cells of the cork granules has been produced. These small cork bodies have a cellular or porous structure, and a microscopic examination of them shows clearly that a very substantial degree of impregnation is, or can be, effected. That the pores and cells of these granules contain latex rubber is clearly evident under the microscope.

The proportion of latex mixed with the cork should be so predetermined that while the desired degree of impregnation and coating of the particles will be effected, nevertheless they will not coalesce and stick together so firmly that they cannot be separated, since such separation by tumbling, running them through a beater, or in some other convenient manner, is essential to subsequent steps in the process. Satisfactory results are obtained by using a 30% latex in sufficient quantity to add from 25% to 50% or more of latex rubber (dry weight) to the weight of the cork. Ordinarily the cork particles, while varying considerably in shape and size, will not be over a few hundredths of an inch in their greatest dimension. A typical size is the so-called 14/24 or 18/30, the significance of these numbers being that in the 18/30 size, for example, the cork particles will pass through a screen having eighteen (18) meshes to the inch, but will not go through a screen having thirty (30) meshes to the inch. As a general rule sizes larger than 14/24 are rather rarely used, but smaller sizes running down to, say, 20/50 are sometimes used, these very fine sizes usually being mixed with larger particles.

The cork so prepared may be stored for a reasonable period, or may be shipped as an article of commerce for use in making combined rubber and cork compositions. In combining it with milled rubber it may be introduced at the point of breaking down the virgin rubber, or at any other convenient stage of the process where it can be distributed substantially uniformly throughout the entire mass. Usually the sulphur and other compounding ingredients are added after the cork has been worked in, and the product is then sheeted and molded as in any process of making rubber soles and heels, or it may be treated in any other way, depending upon the use to be made of it.

In making a good grade of rubber outsoling or heel stock, it is preferable to omit the greater part, if not all, of the customary fillers, such as clay, whiting magnesium carbonate, and the like.

I find that compositions of this kind require a somewhat longer vulcanization period, or a use of a slightly greater proportion of accelerators and activators in order to speed up the vulcanizing operation. Apparently vulcanization is retarded by the presence of the cork particles. However, if these precautions are taken, and the constituents of the mixture are such as to make a good quality of rubber, then by using the pretreatment of the granulated cork, as above described, a product is obtained in which the cork particles are securely anchored in place, which has good flexibility, and ample resistance to abrasion. In other words, it produces a very satisfactory sole, heel, or similar article in which the objections above described to the prior cork and rubber compositions for this purpose are eliminated. In a large measure these results are due to the superior union of the cork particles to the rubber body in which they are embedded. In practically all of these products the rubber is present in a continuous phase which is interrupted at very numerous points by the presence of the cork granules. They are securely held in place, however, by virtue of the fact that the latex rubber with which they are coated is itself united securely to both the cork and the rubber body material. In fact, if the impregnation of the cork has been thorough, then in the subsequent vulcanizing operation the rubber in the pores and cells of the cork granules is vulcanized to the surrounding body of rubber in which these granules are embedded. Thus a union of these rubber and cork constituents is produced which retains the rubber particles in place until they have been largely worn away by abrasion in service.

I prefer to use commercial or concentrated rubber latex in impregnating the cork granules, since the molecules or rubber particles in a dispersion of this character are so small that they will readily penetrate into the pores and cells of the cork bodies, and also because the latex rubber, being in a practically virgin condition and having exceptionally good nerve and toughness, is well adapted to produce a strong bond or union between the cork granules and the surrounding rubber body. A rubber solution, however, such as the rubber naptha cements of commerce will not give satisfactory results. This is largely due to two factors. First, the difference in the nature of the rubber, and second, the difficulty of introducing into the cork particles the necessary quantity of rubber to produce the desired results. As to the former, it may be pointed out that true latex rubber is a strong, tough product with good "nerve" or snap-back, while the residue left after the evaporation of a rubber solution is a weak, plasticized material, much inferior to latex rubber. With regard to the second of these differences, the concentration of rubber solids in cement is only a fraction of that in rubber latex. In addition, the high viscosity of the former makes it a very poor impregnating medium for material such as cork, whereas the very low viscosity of rubber latex of good concentrations such, for example, as the 30% commercial latex of commerce, impregnates cork very readily.

There are other serious disadvantages in handling rubber solutions in a process of this nature which are avoided by the use of rubber latex, such as the fire hazard incurred in the use of the former and the difficulty, if not impossibility, of separating the cork particles after drying so that they can be properly distributed in the milled rubber.

Figure 2:
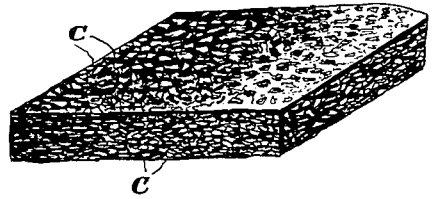

A typical embodiment of the invention is illustrated in the accompanying drawing, in which Figure 1 is a perspective view of a shoe equipped with a rubber sole and heel embodying this invention; and Fig. 2 is a similar view, on a larger scale, of a small section illustrating, as well as possible, the nature of the material of which the sole and heel are composed. The sole is shown at 2 and the heel at 3 in Fig. 1, and the cork particles are indicated at c in Fig. 2. The proportions of the cork and rubber composition may be varied within relatively wide limits. Usually these proportions run somewhere between ten to twenty pounds of impregnated cork to one hundred pounds of rubber composition. The cork is so much lighter in weight than the rubber material that the proportion of bulk which it occupies in the final product is very much higher than the relative weights of these constituents. Such proportions necessarily will vary with the nature of the product to be made.

While I have herein shown and described a typical embodiment of my invention, it will be understood that the invention may be embodied in other forms of tread members or similar shoe parts.

Having thus described my invention, what I desire to claim as new is:

1. A tread member for shoes comprising a milled rubber composition having a substantial proportion of cork granules dispersed therethrough, said granules being impregnated with latex rubber and united thereby to the adjoining portions of said composition.

2. A tread member for shoes comprising a vulcanized milled rubber composition having a substantial proportion of cork granules dispersed therethrough, said granules carrying a sufficient proportion of latex rubber in the pores and cells thereof to unite them securely with the composition in which they are embedded.

3. A tread member for shoe comprising a mixture of milled rubber and cork granules, the rubber being present in a continuous phase and the cork granules being distributed therethrough, and the pores of said particles containing latex rubber which is vulcanized to that in the body of said composition.

4. That improvement in methods of making rubber soles, heels, and the like, which consists in impregnating cork in a granular form with rubber latex, and subsequently mixing the cork particles so treated with a milled rubber compound from which one of said articles is to be made, and thereby dispersing said particles throughout said compound and causing them to unite securely with it.

5. That improvement in methods of making rubber soles, heels, and the like, which consists in mixing cork particles with rubber latex, drying the particles so treated, subsequently separating said particles and mixing them with a milled rubber composition, continuing said mixing operation until the particles are dispersed throughout said composition, and working said composition into the desired form.

6. That improvement in methods of making rubber soles, heels, and the like, which consists in impregnating cork in a granular form with rubber latex, drying the cork particles so impregnated, subsequently working said particles into a milled rubber composition until the particles are distributed throughout the mass, and later shaping and vulcanizing portions of said mass to produce an article of the desired form.

7. A tread member for shoes comprising a milled rubber composition having a substantial proportion of cork particles dispersed therethrough, said particles being coated and the pores and cells thereof being loaded with latex rubber, and the quantity of rubber so carried by said particles being a large percentage of the dry weight of the unimpregnated cork particles and serving to unite the cork particles securely to the surrounding rubber composition.

8. That improvement in methods of making rubber soles, heels, and the like, which consists in impregnating cork in a finely divided form with rubber latex containing at least 25% of rubber solids, drying the cork particles so impregnated, subsequently mixing the cork particles so treated with a milled rubber compound and thereby dispersing said particles throughout said compound, and later vulcanizing the mixture so prepared.

9. A tread member for shoes comprising a milled rubber composition forming the main body material of said member and a substantial proportion of cork granules dispersed throughout said composition and embedded therein, said granules containing sufficient latex rubber in the pores and cells thereof to unite securely with the rubber composition in which they are embedded and thereby to anchor said granules securely in said composition.

10. That improvement in methods of making rubber soles, heels, and the like, which consists in impregnating granulated cork with a rubber dispersion having the small particle size characteristic of rubber latex and of such a character that the dry residue of said dispersion has the strength and nerve also characteristic of rubber latex, during said impregnating operation adding to the weight of the cork at least 25% of its own weight of rubber solids, drying the cork granules so impregnated, subsequently mixing the cork particles so treated with a larger weight of a milled rubber compound adapted when vulcanized to have a high resistance both to abrasion and also to break down due to flexing, continuing said mixing operation until said particles are dispersed throughout said compound, and later vulcanizing the mixture so produced.

ERNEST W. DUNBAR.